(12) United States Patent
Epstein

(10) Patent No.: US 8,702,039 B1
(45) Date of Patent: *Apr. 22, 2014

(54) AIRPLANE LEADING EDGE DE-ICING APPARATUS

(71) Applicant: Eran Epstein, Buffalo, NY (US)

(72) Inventor: Eran Epstein, Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,410

(22) Filed: Apr. 23, 2013

Related U.S. Application Data

(62) Division of application No. 13/088,630, filed on Apr. 18, 2011, now Pat. No. 8,444,093.

(51) Int. Cl.
*B64D 15/02* (2006.01)

(52) U.S. Cl.
USPC .................................. 244/134 B; 244/134 R

(58) Field of Classification Search
USPC .......... 244/134 B, 134 R; 60/39.093; 702/24; 701/14
See application file for complete search history.

(56) References Cited

U.S. PATENT DOCUMENTS

| | | | |
|---|---|---|---|
| 3,704,720 A | | 12/1972 | Kaiser |
| 3,981,466 A | * | 9/1976 | Shah .......................... 244/134 R |
| 4,505,445 A | * | 3/1985 | Allison ...................... 244/134 B |
| 5,098,036 A | | 3/1992 | Brigham et al. |
| 5,190,249 A | | 3/1993 | Whitmire et al. |
| 5,222,696 A | | 6/1993 | Brigham et al. |
| 5,228,643 A | * | 7/1993 | Manda et al. ............. 244/134 B |
| 5,242,133 A | | 9/1993 | Zwick |
| 5,282,590 A | | 2/1994 | Zwick |
| 5,423,174 A | | 6/1995 | Mouton |
| 5,484,122 A | | 1/1996 | DeSalve |
| 5,558,303 A | | 9/1996 | Koethe et al. |
| 5,845,848 A | | 12/1998 | Amako et al. |
| 5,845,878 A | | 12/1998 | Rauckhorst, III et al. |
| 5,904,321 A | | 5/1999 | Cox et al. |
| 5,968,407 A | | 10/1999 | Boluk et al. |
| 7,131,612 B2 | * | 11/2006 | Baptist et al. ............. 244/134 R |
| 7,823,374 B2 | * | 11/2010 | Venkataramani et al. . 60/39.093 |
| 7,900,437 B2 | * | 3/2011 | Venkataramani et al. ...... 60/267 |
| 2008/0053100 A1 | * | 3/2008 | Venkataramani et al. ...... 60/772 |
| 2009/0218541 A1 | | 9/2009 | Wehner et al. |
| 2010/0096507 A1 | | 4/2010 | Villinger |

FOREIGN PATENT DOCUMENTS

| | | |
|---|---|---|
| DE | 3412415 | 10/1985 |
| GB | 2147364 | 5/1984 |

* cited by examiner

*Primary Examiner* — Philip J Bonzell

(74) *Attorney, Agent, or Firm* — Del Vecchio and Stadler LLP

(57) ABSTRACT

An airplane leading edge de-icing apparatus having a heat diffuser for heating the leading edges of an airplane is provided. The heat diffuser has a first heat diffuser side having a concave shape and a second heat diffuser side having a convex shape. The heat diffuser is joined to the leading edge of an airplane. A counter current heat exchanger is provided and heats a heat transfer fluid with heat energy absorbed from hot gases. The heat transfer fluid is pumped in and out of a reservoir tank with a first pump. A second pump pumps the heat transfer fluid in and out of the heat diffuser. The heat energy in the heat transfer fluid housed in the heat diffuser is transferred to the convex surface of the second heat diffuser side and prevents and/or melts ice build-up.

4 Claims, 3 Drawing Sheets

Figure 5:
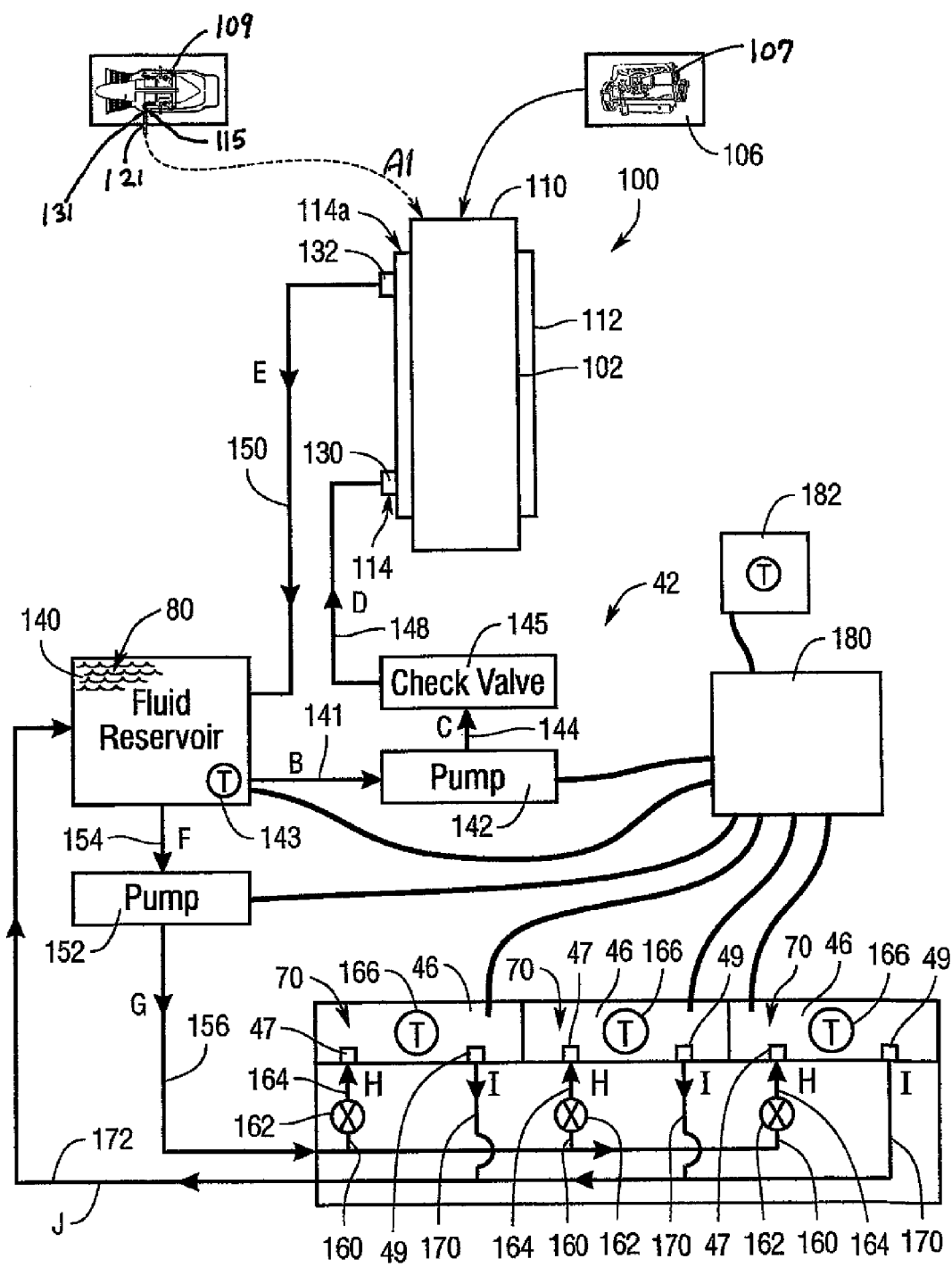

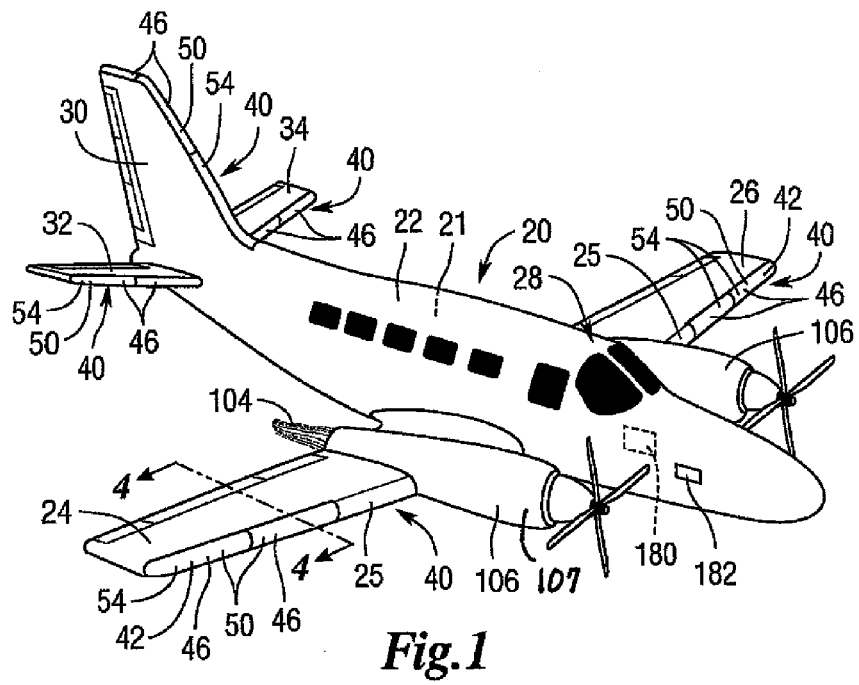
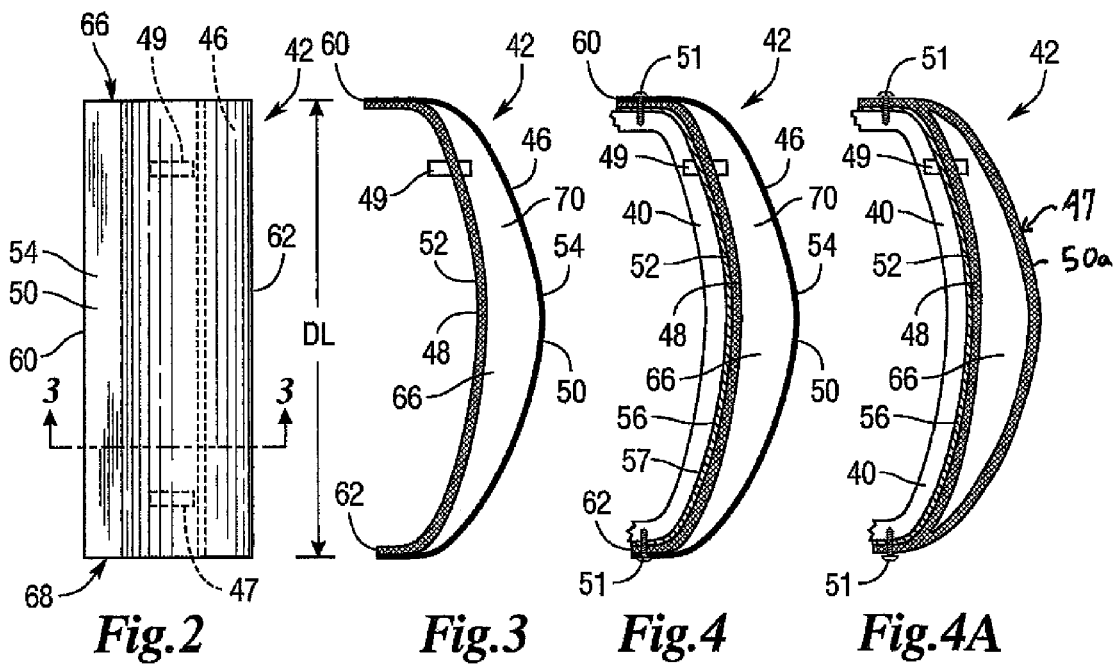

AIRPLANE LEADING EDGE DE-ICING APPARATUS

CROSS REFERENCE TO RELATED APPLICATION

This application is a divisional of U.S. patent application Ser. No. 13/088,630, filed on Apr. 18, 2011 the contents of which are hereby incorporated herein by reference.

BACKGROUND

Ice build-up on the leading edges of an airplane, that is the wings and tailfins, is a dangerous problem. It has been and continues to be one of the leading causes of airplane crashes. The ice build-up adds to the weight of the airplane, interferes with airflow, and causes critical aircraft components to freeze in place.

Presently there are only a few options available to overcome the ice build-up problem. One option is to attach expandable rubber boots to the leading edges of the airplane wings (and tailfin) and actuating the boots (usually with air), such that they extend in a direction away from the leading edges. The purpose of this is to cause any ice build-up on the leading edges to break apart and fall to the earth. One of the problems with this is that if the boots are deployed too early, then the water/rain on the leading edges has a tendency to freeze the boots in place. This leads to more undesirable ice build-up.

Another option is sometimes referred to as the weeping wing design. A pump is provided and it pumps antifreeze fluid (glycol) through small holes in the leading edges. One of the problems with this option is that the fluid runs out too quickly (it typically lasts for 2 hours), and thus the fluid reservoir is always is in need of refilling.

Another drawback associated with the first two options is that they each require constant pilot attention.

Another option is to provide electrical heaters for heating the leading edges and using the heat energy to melt the ice. However, electrical heaters cause an undesirable draw on engine horsepower and may undesirably increase the risk of a fire on the aircraft.

Thus, there is an immediate need for an apparatus and method for melting ice build-up on leading edges of an airplane that is easy to use and install, energy efficient, lightweight and reliable. There is also a need for the apparatus to operate in a manner that poses little risk of starting a fire on the airplane.

SUMMARY

A heat diffuser for heating the leading edges of an airplane is provided, and the heat diffuser has a first diffuser side having a concave shape with a concave surface. A second heat diffuser side having a convex shape with a convex surface is joined to the first heat diffuser side along a first edge and an opposed second edge. A first diffuser end joined to the first heat diffuser side and the second heat diffuser side, and a second diffuser end joined to the first heat diffuser side and the second heat diffuser side such that the first diffuser end and the second diffuser end are opposed. The heat diffuser is joined to the leading edge with an adhesive or screws such that it may be readily joined and removed from the leading edge. A diffuser cavity is defined internal to the heat diffuser. Heat transfer fluid that has been heated is pumped through the heat diffuser and the heat transfers through the second heat diffuser side to melt and/or prevent ice build-up on the leading edge.

A fluid circuit is provided for distributing heat transfer fluid that has been heated to the heat diffuser and includes a counter current heat exchanger for capturing heat energy from the exhaust gases exiting the airplane engine. There is a first pump capable of pumping the heat transfer fluid from a reservoir tank and through a counter current heat exchanger such that it is heated, and then back to the reservoir tank. A second pump is provided and is capable of pumping heat transfer fluid from the reservoir tank, though a delivery tube, a tap tube, a solenoid valve, a diffuser tube, and through the heat diffuser to thus heat the heat diffuser. The second pump also returns the heat transfer fluid back to the reservoir tank through a diffuser return tube.

A micro-controller is provided and receives temperature data from an outside air temperature probe, a tank temperature probe disposed in the reservoir tank, and a temperature probe disposed in the diffuser. The micro-controller controls the first and second pumps and the solenoid valve to ensure optimal circulation of the heat transfer fluid in the heat diffuser to melt or prevent ice build-up on the leading edge of the airplane.

A method of melting and/or preventing ice build-up on the leading edges of an airplane is provided. A heat diffuser is joined to the leading edge of an airplane. A fluid circuit is provided for delivering heat transfer fluid that has been heated to the heat diffuser. Heat energy is transferred through the heat diffuser to melt ice and prevent ice from building up on the heat diffuser.

BRIEF DESCRIPTION OF THE DRAWING FIGURES

Figure 6:
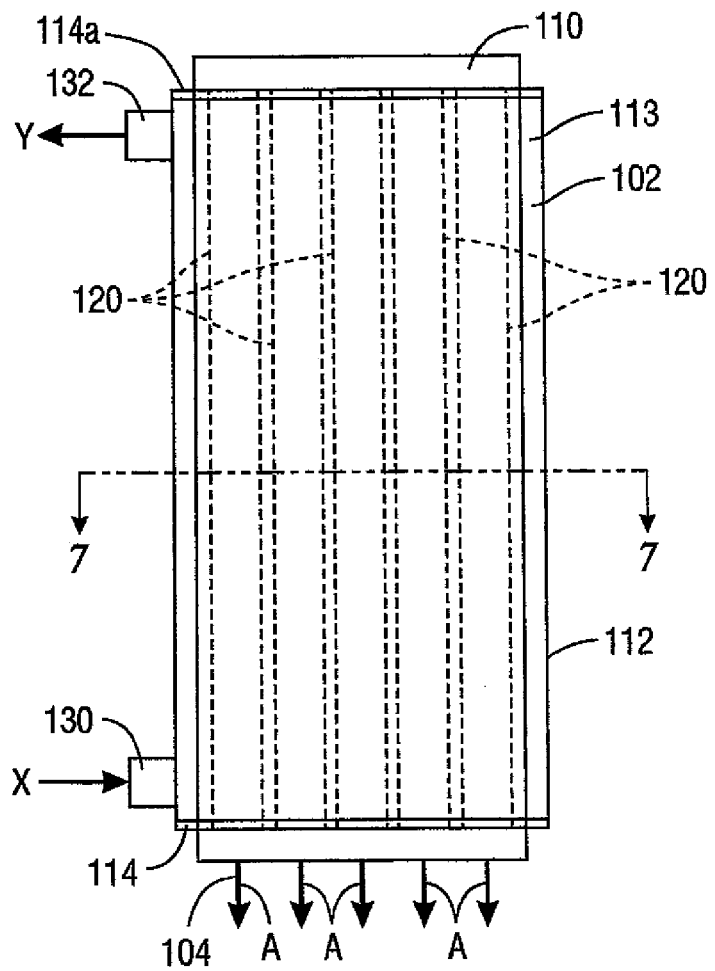
Figure 7:
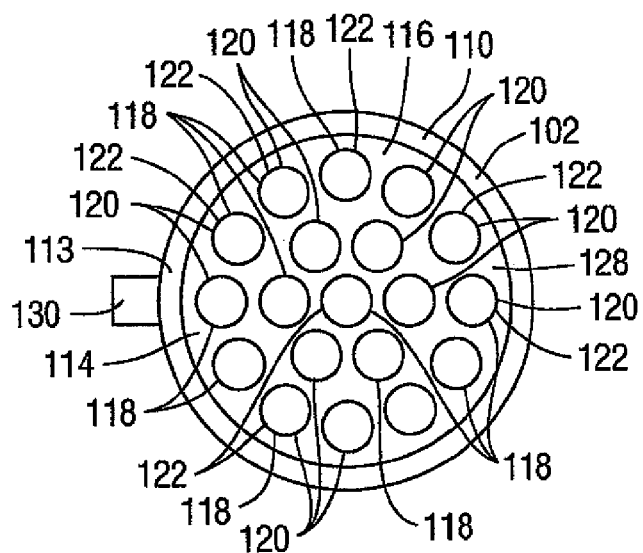

FIG. 1 is a perspective view of an airplane.
FIG. 2 is a top plan view of a heat diffuser
FIG. 3 is a sectional view of the heat diffuser taken along line 3-3 of FIG. 2.
FIG. 4 is a sectional view of heat diffuser joined to a leading edge of a wing taken along line 4-4 of FIG. 1.
FIG. 4A is a sectional view of another embodiment of a heat diffuser.
FIG. 5 is a schematic of a fluid circuit.
FIG. 6 is a top plan view of a counter current heat exchanger.
FIG. 7 sectional view of the counter current heat exchanger taken along line 7-7 of FIG. 6.

DESCRIPTION

As shown in FIG. 1 there is an airplane 20 having a fuselage 22, and first and second wings 24, 26 joined to the fuselage 22. The airplane 20 also has a cockpit 28. A tail fin 30 and first and second horizontal stabilizers 32, 34 extend from the fuselage 22. Each of the first and second wings 24, 26, tail fin 30 and first and second horizontal stabilizers 32, 34 has a leading edge commonly designated herein by reference number 40. The airplane 20 has a pair of engines commonly designated 106. In one of the preferred embodiments the engines 106 are piston engines 107. The use of piston engines 107 in connection with an aircraft 20 is well known to those having ordinary skill in the art and is therefore not described herein in detail.

The airplane leading edge de-icing apparatus 42 includes a heat diffuser 46. The heat diffusers 46 may be joined to all or less than all of the leading edges 40 of the airplane 20. As shown in FIG. 1 and for illustrative purposes, portions 25 of the leading edges 40 proximal the engines 106 are exposed, that is, a heat diffuser 46 is not joined to the portions 25 of the leading edges 40. It is to be understood that a heat diffusers 46 may be joined to cover the portions 25 of the leading edges 40 that are exposed in FIG. 1.

The heat diffuser 46 shown in FIGS. 2-4 has a heat diffuser length designated DL. In one of the preferred embodiments the length DL is about five feet. The heat diffuser length DL may be more or less than five feet in other embodiments to meet the design requirements of virtually any application. For example, the heat diffusers 46 may be constructed such that they have diffuser lengths DL's of one, two, three, four or more than 5 feet. In addition, virtually any desired combination of heat diffusers 46 of the same or different lengths may be utilized to achieve the desired coverage of the leading edge 40.

As shown in FIGS. 3 and 4 the heat diffuser 46 has opposed first and second heat diffuser sides 48, 50. The first heat diffuser side 48 has a concave shape with a concave surface 52, and in one of the preferred embodiments comprises plastic, for example acrylonitrile butadiene styrene plastic (also sometimes referred to herein as ABS plastic).

The second heat diffuser side 50 has a convex shape with a convex surface 54. In one of the preferred embodiments the second heat diffuser side 50 is formed from sheet metal 55 that is thin, for example, stainless steel, aluminum, and/or metal alloys, and is lightweight. In one of the preferred embodiments the thickness of the second heat diffuser side 50 is about 0.02 inches to about 0.06 inches. The second heat diffuser side 50 may be variously embodied, for example, the second heat diffuser side 50 may be formed such that when joined to the airplane 20 it covers virtually any desired amount of the first and second wings 24, 26, tail fin 30 and first and second horizontal stabilizers 32, 34. The first and second heat diffuser sides 48, 50 meet and are joined along first and second edges 60, 62 that extend along the length DL of the heat diffuser 46. The first and second heat diffuser sides 48, 50 are joined together by fusing them together with heat, or with an epoxy, or with a suitable sealing compound. Suitable sealing compounds are commercially available, for example Flamemaster, 13576 Desmond Street, Pacoima, Calif. 91331-2315 is a provider of sealing compounds.

The heat diffuser 46 has opposed first and second diffuser ends 66, 68, as shown in FIG. 2, each of which is joined with the first and second heat diffuser sides 48, 50. The first and second diffuser ends 66, 68 may be made of the previously described plastic or from thin sheet metal. As shown in FIG. 4, the adhesive 56 is disposed between, contacts and joins the leading edge 40 of the airplane 20 and the first heat diffuser side 48. Thus, when the airplane 20 is in flight the convex surface 54 of the heat diffuser 46 is exposed to the oncoming airflow. FIG. 4A shows another preferred embodiment wherein the second heat diffuser side 50a has a convex surface 54a and is made of plastic, for example ABS plastic. The first and second heat diffuser sides 48, 50a, and the first and second diffuser ends 66, 68, are plastic such that the heat diffuser 46a is formed or molded as a unitary one-piece body 47. The methods of forming plastic and ABS plastic into shapes is well known to those having ordinary skill in the art and is therefore not described in detail herein.

As best shown in FIG. 4, in one of the preferred embodiments an adhesive 56 is applied to the leading edge 40 or is applied to the concave surface 52 of the first heat diffuser side 48, or both. The first heat diffuser side 48 of the heat diffuser 46 is pressed against the leading edge 40 thus joining the heat diffuser 46 and the leading edge 40. The adhesive 56 is waterproof and allows the heat diffuser 46 to be releasably joined to the leading edge 40. In particular, the adhesive 56 allows for the manual removal of the heat diffuser from the leading edge 40. The adhesive 56 may be in the form of an adhesive layer 57 that is applied to the first heat diffuser side 48 and/or the leading edge 40. In other preferred embodiments the heat diffuser 46 may be joined to the leading edges 40 with suitable fasteners, for example screws 51, as shown in FIGS. 4 and 4A, and the adhesive 56 would be optional. Thus, the heat diffuser 46 may be joined with and removed from the leading edge 40 quickly. This advantageously allows for the quick installation and removal of the heat diffuser 46 from the leading edge 40 and further allows for quick replacement, repair, servicing and inspection of the heat diffuser 46. As will be described presently, the heat diffuser 46 advantageously prevents ice build-up on the leading edge 40 and also melts ice build-up on the leading edge 40, thus significantly decreasing the chances of the airplane 20 undesirably falling from the sky due to ice load or loss of control. In addition, if there is ice build-up the heat diffuser 46 will cause the built-up ice to be quickly shed from the leading edge 40.

The first and second heat diffuser sides 48, 50 and the opposed first and second diffuser ends 66, 68 define therein a diffuser cavity 70. The diffuser cavity 70 is for holding a heat transfer fluid 80. In addition, the heat diffuser 46 has a diffuser inlet port 47 and a diffuser outlet port 49 for allowing a heat transfer fluid 80 to flow in and out of the diffuser cavity 70. In one of the preferred embodiments the heat transfer fluid 80 is an inert, high viscosity, high temperature silicone oil having a boiling point of about or over 500 degrees Celsius. Since inert silicone oil is used as the heat transfer fluid 80 the risks associated with the system are minimal. Even in a worst-case scenario, for example a leak inside the counter current heat exchanger 102 (to be described presently), the heat transfer fluid 80 would advantageously be ejected via the exhaust pipe 110 (to be described presently), and an in-flight fire cannot occur. Other high temperature oils and fluids may be used as the heat transfer fluid 80 in other preferred embodiments. The heat diffusers 46 provide for a constant heat source at the leading edges 40 of the airplane 20 to advantageously prevent ice adhesion and build-up.

As shown in FIG. 5 the airplane leading edge deicing apparatus 42 includes a fluid circuit 100 that circulates the heat transfer fluid 80. The fluid circuit 100 includes a counter current heat exchanger 102 that advantageously transfers heat energy from the hot exhaust gases 104 discharged from the engine 106 of the airplane 20 to the heat transfer fluid 80, such that the exhaust gases 104 serve as the heat source for the fluid circuit 100. It is pointed out that the engine 106 shown in FIG. 1 is a piston driven engine.

The counter current heat exchanger 102 is best shown in FIGS. 5-7. The exhaust gases 104 flow from the engine 106 through and through an exhaust pipe 110. The exhaust gases 104 flow in the direction of the arrow designated A. The counter current heat exchanger 102 has a housing 112 that includes a housing body portion 113 joined to substantially identically shaped first and second housing end walls 114, 114a with, for example a weld. As shown in FIG. 7 the first housing end wall 114 has a plurality of pipe openings 118 each being sized to receive an exhaust heat transfer pipe 120. Each of the exhaust heat transfer pipes 120 is welded with a weld 122 to the first housing end wall 114 where it meets with the first housing end wall 114 such that the exhaust heat transfer pipes 120 are internal to the housing 112. The second housing end wall 114a is structurally identical to the first housing end wall 114 and the exhaust heat transfer pipes 120 are welded to it in the same manner as previously described in connection with the first housing end wall 114. The first and second housing end walls 114, 114a are fluid tight in that no fluid can seep between the exhaust heat transfer pipes 120 and the first and second housing end walls 114, 114a, and no fluid can seep between the first and second housing end walls 114, 114a and the housing body portion 113. The housing 112 has a housing interior 128 for receiving the heat transfer fluid 80. The exhaust gases 104 flow from the engine 106 and through the exhaust pipe 110, through the plurality exhaust heat transfer pipes 120, and back into the exhaust pipe 110.

A housing inlet port 130 is joined to the housing body portion 113 proximal the first housing end wall 114, and an outlet port 132 is joined to the housing body portion 113 proximal the second housing end wall 114a. The inlet and outlet ports 130, 132 may be joined to the housing body portion 113 with welds. Heat transfer fluid 80 enters the inlet port 130 in the direction indicated by the arrow designated X (shown in FIG. 6) and flows into the interior 128 of the housing 112 and flows around the exhaust heat transfer pipes 120. The heat transfer fluid 80 flows out of the housing 112 though the outlet port 132. The heat transfer fluid 80 absorbs heat energy while flowing through the housing interior 128. Thus, the counter current heat exchanger 102 is capable of generating a supply of heat transfer fluid 80 that is heated.

As shown in FIG. 5, in another preferred embodiment a jet engine 109 having a compressor 115 is provided. The compressor 115 compresses incoming air causing the air to become hot air 131. A hot air tube 121 (shown in part in dashed lines) is joined to the jet engine 109 and is joined to the exhaust pipe 110. The hot air 131 flows through the hot air tube 121 (in the direction of arrow A1) and into the counter current heat exchanger 102. The hot air 131 flows around the exhaust heat transfer pipes 110 thus heating the heat transfer fluid 80 in the same manner as previously described.

The fluid circuit 100 further includes a reservoir tank 140 for holding a supply of the heat transfer fluid 80. A first pump 142 is provided and is for pumping the heat transfer fluid 80 from the reservoir tank 140 (as indicated by the arrow designated B) through a first reservoir outflow tube 141. The first reservoir outflow tube 141 is joined with, for example a welds, to the reservoir tank 140 and the first pump 142. A tank temperature probe 143 is disposed in the heat transfer tank 140 for monitoring the temperature of the heat transfer fluid 80 in the reservoir tank 140.

The first pump 142 is also joined to a first pump tube 144. The first pump tube 144 is joined to a check valve 145. The first pump 142 is for pumping the heat transfer fluid 80 through the first pump tube 144 in the direction indicated by the arrow designated C. The first pump tube 144 is joined to the first pump 142 and the check valve 145 with, for example welds. The check valve 145 is for preventing backflow of the heat transfer fluid 80 through the first pump 142. An inlet tube 148 is provided and is joined to the check valve 145 and the inlet port 130 with, for example welds. The heat transfer fluid 80 is then pumped through the inlet tube 148 and through the inlet port 130 of the counter current heat exchanger 102 (as indicated by the arrow designated D), through the counter current heat exchanger 102 and out the outlet port 132 (as indicated by the arrows designated E). The heat transfer fluid 80 is pumped through the counter current heat exchanger 102 in a direction opposite the direction of flow of the exhaust gases 104. In another preferred embodiment the check valve 145 is not present and the first pump tube 144 is joined directly to the inlet port 130 with, for example a weld.

The first pump 142 pumps the heat transfer fluid 80 that has been heated back to the reservoir tank 140 through a first reservoir inflow tube 150. The first reservoir inflow tube 150 is joined to the reservoir tank 140 with, for example a weld, and is joined to the outlet port 132 with, for example a weld.

Thus, the heat transfer fluid 80 in the reservoir tank 140 is capable of being supplied with heat transfer fluid 80 that has been heated in the counter current heat exchanger 102. In one of the preferred embodiments the temperature of the heat transfer fluid 80 in the reservoir tank 140 is maintained at a temperature of about 150 degrees Celsius by way of the above-described circulation.

The fluid circuit 100 further includes a second pump 152 for pumping heat transfer fluid 80 from the reservoir tank 140 (as indicated by the arrow designated F) through a second reservoir outflow tube 154. The second reservoir outflow tube 154 is joined to the reservoir tank 140 and the second pump 142 with, for example a weld. The second pump 152 pumps the heat transfer fluid 80 through a delivery tube 156 as indicated by the arrow designated G. The delivery tube 156 provides a common source of heat transfer fluid 80 for each of the heat diffusers 46 shown in FIG. 5. In particular, tap tubes 160 are joined to and tap into the delivery tube 156. The delivery tube 156 is joined to the tap tubes 160 with, for example welds. Each tap tube 160 is joined to a solenoid valve 162. A diffuser tube 164 is joined with and extends from each of the solenoid valves 162. The diffuser tube 164 and solenoid valve 162 may be joined with a weld. One of the diffuser tubes 164 is joined with each of the diffuser inlet ports 47, with for example a weld, such that heat transfer fluid 80 can flow into the diffuser cavity 70 defined in that heat diffuser 46. Heat transfer fluid 80 flows in the direction of the arrow designated H when the solenoid valve 162 for that heat diffuser 46 is opened. Once opened, the solenoid valve 162 allows heat transfer fluid 80 to flow through the diffuser inlet port 47 and into the above-described diffuser cavity 70. Thus, the heat energy stored in the heat transfer fluid 80 is transferred to and through convex surface 54 of the second heat diffuser side 50 such that the convex surface 54 is heated. Each diffuser cavity 70 has a diffuser temperature probe 166 for detecting the temperature of the heat transfer fluid 80 in that diffuser cavity 70. The second pump 152 pumps the heat transfer fluid 80 through the diffuser cavity 70 and out the diffuser outlet port 49. It is pointed out the first and second diffuser ports 47, 49 extend though the leading edge 46 of the wing 24 in one of the preferred embodiments and as shown in FIG. 4. This does not impact the structural integrity of the airplane 20. The exiting heat transfer fluid 80 then pumped though a diffuser return tube 170 associated with that heat diffuser 46 (in the direction indicated by the arrow designated I) and returns to the reservoir tank 140 through a common return tube 172 (as indicated by the arrow designated J). The diffuser return tube 170 is joined to the common return tube 172, and the common reserve tube 172 is joined to the reservoir tank 140 with, for example welds. It is pointed out that the first and second pumps 142, 152 are powered by the electrical system of the airplane 20.

In one of the preferred embodiments the first reservoir outflow tube 141, the first pump tube 144, the inlet tube 148, the first reservoir inflow tube 150, the second reservoir outflow tube 154, the delivery tube 156, the tap tubes 160, the diffuser tubes 164, the diffuser return tubes 170, and the common return tube 172 are made from aluminum. In other preferred embodiments they may be made of lightweight material, for example metal and metal alloys. This advantageously ensures the airplane leading edge de-icing apparatus 42 is lightweight.

The airplane leading edge de-icing apparatus 42 also includes a micro-controller 180 is mounted in the cockpit 28 of the airplane 20 and is in communication with the following: an outside air temperature probe 182 mounted on the airplane 20 that constantly monitors the outside air temperature, the tank temperature probe 143 disposed in the reservoir tank 140, and each of the diffuser temperature probes 166. The micro-controller 180 controls the first and second pumps 142, 152 and the solenoid valves 162 to ensure optimal circulation of the heat transfer fluid 80. The micro-controller 180 also alerts a pilot in the event the heat transfer fluid 80 temperature falls outside the system parameters so that adequate measures may be taken by the pilot, for example flying out of the icing conditions or other inclement weather. Micro-controllers 180 and the programming and use of micro-controllers 180 to control pumps and solenoid valves and detect temperatures is well know to those having ordinary skill in the art and are therefore not described in detail herein. Micro-controllers 180 suitable for use are commercially available from, for example Parallax Inc., having an address of 599 Menlo Drive, Rocklin, Calif. 95765; phone (888) 512-1024. In addition, there are other suppliers of micro-controllers 180.

In use, the pilot starts the engine 106 and the micro-controller 180 automatically receives outside air temperature data from the outside air temperature probe 182, and heat transfer fluid temperature data regarding the temperature of the heat transfer fluid in the in the reservoir tank 140 from the tank temperature probe 143, and heat transfer fluid temperature data regarding the temperature of the heat transfer fluid in the heat diffusers 46 from the diffuser temperature probes 166. The micro-controller 180 automatically compares the data with predetermined parameters to assess the heating needs of the diffusers 146. The micro-controller 180 automatically controls the operation of the first and second pumps 142, 152 along with the opening and closing of the solenoid valves 162 to ensure the temperature of the heat transfer fluid 80 disposed in the heat diffuser 46 is maintained in a predetermined temperature range.

It is pointed out that the micro-controller 180 is constantly monitoring conditions of the reservoir tank 140 and maintains the temperature of the heat transfer fluid 80 in the reservoir tank 140 at about 150 degrees Celsius. This is accomplished by activating the first pump 142 and circulating the heat transfer fluid 80 through the counter current heat exchanger 102 and back to the reservoir tank 140 and as previously described. Thus, there is always a supply of heat transfer fluid 80 that is about 150 degrees Celsius ready for distribution to the heat diffusers 46 to melt ice or preventing ice build-up. It is pointed out that in flight the heat transfer fluid 80 in the heat diffuser 46 is maintained at any suitable predetermined temperature, for example between about 70 and 90 degrees Fahrenheit. Such temperatures are sufficient to melt ice and to prevent ice build-up.

In use and as an example, assume the airplane 20 is flying through clouds and enters a layer of air where the outside air temperature is 15 degrees Fahrenheit and the temperature of the heat transfer fluid 80 in the heat diffuser 46 falls below the predetermined temperature parameters. The micro-controller activates the second pump 152 causing it to pump the heated heat transfer fluid 80 to the heat diffuser 46, and the micro-controller 180 also causes the solenoid valves 162 to open. The heat transfer fluid 80 is pumped into the heat diffuser 46 by way of the delivery tube 156, the tap tube 160, though the solenoid valve 162 and through the diffuser tube 164, such that heat transfer fluid 80 that is heated flows into the diffuser cavity 70. The heat energy in the heat transfer fluid 80 is transferred through the second heat diffuser side 50 and is transferred to the convex surface 54. The heated convex surface 54 melts or prevents ice-build up on the leading edge 40 of the airplane 20. It is pointed out that because the first side 48 of the heat diffuser 46 is plastic (FIGS. 3-4A) the first side 48 serves as a thermal insulator to prevent the heat energy in the heat transfer fluid 80 from being transferred to the interior 21 of the airplane 20. The micro-controller 180 continuously activates the first and second pumps 142, 152 and the solenoid valves 162 to maintain the temperature of the heat transfer fluid 80 in each heat diffuser 46 in the predetermined range, thus ensuring no ice build-up and/or constant ice melting.

The airplane leading edge deicing apparatus 42 is advantageously capable of operating automatically and requires no pilot input once activated. In addition, the airplane leading edge deicing apparatus 42 draws a very minimal amount of engine horsepower and thus little additional load is placed on the engine 106 to achieve constant de-icing. As an illustrative example, the counter current heat exchanger 102 captures a portion of the 115,000 British Thermal Units (BTU's) of heat energy generated during the burning of one gallon of gasoline or jet fuel and the fluid circuit 100 distributes this heat energy the diffusers 46.

Another advantage of the airplane leading edge deicing apparatus 42 is that it is easy to install and removed from virtually any existing airplane 20 without having to make substantial structural changes to leading edges 40 of the airplane 20. Another advantage of airplane leading edge deicing apparatus 42 is that it takes up a minimal amount of space in the interior 21 of the airplane 20 and adds a minimal amount of weight to the airplane 20. Another advantage of the airplane leading edge deicing apparatus 42 is that the micro-controller 180 constantly monitors the temperature of the heat transfer fluid 80 in the reservoir tank 140 and the heat diffusers 46, controls the opening and closing of the first and second pumps 142, 152, and controls the opening and closing of the solenoid valves 162 to maintain the temperature of the heat transfer fluid in the reservoir tank 140 at about 150 degrees Celsius and requires a minimal amount of pilot oversight. Thus, a supply of heat transfer fluid 80 that is heated is constantly available for purposes of melting or preventing ice build-up. The micro-controller 180 also advantageously alerts the pilot when there is a problem with the leading edge deicing apparatus 42, for example a failure of the first pump 142 or failure of a solenoid valve 162. This allows any such problems to be immediately rectified. Another advantage of the airplane leading edge deicing apparatus 42 is that because after it is turned on it automatically begins operating thus allowing the pilot to focus on flying the airplane 20.

Another advantage of the leading edge deicing apparatus 42 is that even if the counter current heat exchanger 102 were to spring a leak the heat transfer fluid 80 would be harmlessly expelled out of the engine along with the exhaust gases 104, thus eliminating all chances of causing a fire on the airplane 20.

One fluid circuit 100 is sufficient for handling all the ice melting and heating needs for all the heat diffusers 46 joined to the airplane 20. But in other preferred embodiments both engines 106 may be equipped with the above-described airplane leading edge de-icing apparatus 42.

It will be appreciated by those skilled in the art that while the airplane leading edge de-icing apparatus 42 has been described in detail herein, the airplane leading edge de-icing apparatus 42 is not necessarily so limited and other examples, embodiments, uses, modifications, and departures from the described embodiments, examples, and uses may be made. All of these embodiments are intended to be within the scope and spirit of the airplane leading edge de-icing apparatus 42.

What is claimed:

1. A method of preventing or melting ice-build up on the leading edge of an airplane comprising the acts of:
   providing a counter current heat exchanger, and providing a reservoir tank for containing a heat transfer fluid;
   providing a first pump and joining a first reservoir tube to the first pump and to the reservoir tank;
   providing a first pump tube and a check valve and joining the first pump tube to the check valve and the first pump;
   providing an inlet tube and joining the inlet tube to the check valve and to the counter current heat exchanger, and joining a first reservoir inflow tube to the counter-current heat exchanger and to the reservoir tank;
   providing a second pump and joining a second reservoir outlet tube to the second pump and to the reservoir tank, and providing a delivery tube and joining the delivery tube to the to the second pump;
   providing a tap tube and joining the tap tube to the delivery tube and providing a solenoid valve and joining the solenoid valve to the tap tube, and providing a diffuser tube and joining the diffuser tube to the solenoid valve;
   providing a heat diffuser and joining the heat diffuser to the diffuser tube;
   providing a diffuser return tube and joining the diffuser return tube to the heat diffuser;
   providing a common return tube and joining the diffuser return tube to the common return tube, and joining the common return tube to the reservoir tank;
   using the first pump for pumping the heat transfer fluid from the reservoir tank and through the check valve and through the counter current heat exchanger and back to the reservoir tank, and
   using the second pump for pumping heat transfer fluid from the reservoir tank, through the delivery tube, through the tap tube, through the solenoid valve, through diffuser tube, through the heat diffuser, through the diffuser return tube and through the common return tube and back to the reservoir tank.

2. The method according to claim 1 further including providing a micro-controller and controlling the pumping of the heat transfer fluid with the micro-controller for maintaining the temperature of the heat transfer fluid within a predetermined range of temperatures.

3. The method according to claim 1 further including providing the heat diffuser with a first heat diffuser side having a concave shape, a second heat diffuser side having a convex shape and defining a diffuser cavity in the heat diffuser for holding the heat transfer fluid.

4. The method according to claim 1 further including providing the heat transfer fluid to be a high temperature oil and providing the heat diffuser to be removably joined to the leading edge.

* * * * *